United States Patent
Tang et al.

(10) Patent No.: US 11,889,220 B2
(45) Date of Patent: Jan. 30, 2024

(54) METHOD FOR CODING SPACE INFORMATION IN CONTINUOUS DYNAMIC IMAGES

(71) Applicant: IDEAPOOL TECHNOLOGY CO., LTD., Beijing (CN)

(72) Inventors: Xingbo Tang, Beijing (CN); Yu He, Beijing (CN)

(73) Assignee: IDEAPOOL TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/924,205

(22) PCT Filed: Mar. 10, 2021

(86) PCT No.: PCT/CN2021/079946
§ 371 (c)(1),
(2) Date: Nov. 9, 2022

(87) PCT Pub. No.: WO2022/183517
PCT Pub. Date: Sep. 9, 2022

(65) Prior Publication Data
US 2023/0239422 A1 Jul. 27, 2023

(30) Foreign Application Priority Data
Mar. 5, 2021 (CN) .......................... 202110242817.X

(51) Int. Cl.
*H04N 5/222* (2006.01)
*H04N 5/262* (2006.01)

(52) U.S. Cl.
CPC .......... *H04N 5/2226* (2013.01); *H04N 5/262* (2013.01)

(58) Field of Classification Search
CPC .... H04N 5/2226; H04N 5/262; H04N 5/2224; H04N 7/142; H04N 21/236; H04N 5/268; H04N 5/76; H04N 23/80; G06T 7/50
See application file for complete search history.

(56) References Cited

U.S. PATENT DOCUMENTS

| 7,606,313 | B2 * | 10/2009 | Raman ................. H04N 19/895 |
| | | | 375/240.26 |
| 10,341,632 | B2 * | 7/2019 | Pang .................... H04N 13/161 |

(Continued)

FOREIGN PATENT DOCUMENTS

| CN | 101409788 A | 4/2009 |
| CN | 101651841 A | 2/2010 |

(Continued)

OTHER PUBLICATIONS

International Search Report dated Nov. 22, 2021 for PCT/CN2021/079946.

*Primary Examiner* — Luong T Nguyen
(74) *Attorney, Agent, or Firm* — Schmeiser, Olsen & Watts, LLP

(57) ABSTRACT

A coding method for space information in continuous dynamic images is provided, which includes the following steps: parsing and extracting space information data, constructing a space information data packet, and coding the space information data packet. According to the coding method in the present invention, the physical parameters, such as lens, position and orientation of a camera as well as space depth information in a plurality of continuous dynamic images can be recorded and stored in real time, and therefore, the coded and stored parameters of the camera and the space depth information are applied to virtual simulation and graphic vision enhancement scenarios, such that in many application scenarios, such as photographing movie and television, producing advertising, and personal video (Continued)

vlogs, abundant and integrated graphic text enhancement effects can be implanted, in real time, a plurality of thereby improving the final image display effect.

7 Claims, 5 Drawing Sheets

(56) References Cited

U.S. PATENT DOCUMENTS

| | | |
|---|---|---|
| 2018/0020204 A1 | 1/2018 | Pang et al. |
| 2019/0333541 A1* | 10/2019 | Mack ..................... G11B 27/10 |
| 2019/0358547 A1* | 11/2019 | Mack ................. H04N 21/2187 |
| 2020/0286279 A1* | 9/2020 | Sheng ................. H04N 13/172 |

FOREIGN PATENT DOCUMENTS

| | | |
|---|---|---|
| CN | 101668219 A | 3/2010 |
| CN | 105933689 A | 9/2016 |
| CN | 106960027 A | 7/2017 |
| CN | 107948466 A | 4/2018 |
| CN | 111669567 A | 9/2020 |
| WO | 2019066191 A1 | 4/2019 |
| WO | 2019226865 A1 | 11/2019 |
| WO | 2020162542 A1 | 8/2020 |

* cited by examiner

| Package head logo | X | Y | Z | PAN | TILT | ROLL | ZOOM | Package tail logo |

| Y₀ | U₀₁ | D₀ | Y₁ | V₀₁ | D₁ | Y₂ | U₂₃ | D₂ | Y₃ | V₂₃ | D₃ | ... |

| Y0-0 | U0-01 | Y0-1 | V0-01 | Y0-2 | U0-23 | Y0-3 | V0-23 | ... |
|------|-------|------|-------|------|-------|------|-------|-----|
| D0-0 |       | D0-1 |       | D0-2 |       | D0-3 |       | ... |
| Y1-0 | U1-01 | Y1-1 | V1-01 | Y1-2 | U1-23 | Y1-3 | V1-23 | ... |
| D1-0 |       | D1-1 |       | D1-2 |       | D1-3 |       | ... |
| ...  |       |      |       |      |       |      |       |     |

FIG. 7

| Y0-0 | U0-01 | Y0-1 | V0-01 | Y0-2 | U0-23 | Y0-3 | V0-23 | ... |
|------|-------|------|-------|------|-------|------|-------|-----|
| Y1-0 | U1-01 | Y1-1 | V1-01 | Y1-2 | U1-23 | Y1-3 | V1-23 | ... |
| ...  |       |      |       |      |       |      |       |     |
| D0-0 |       | D0-1 |       | D0-2 |       | D0-3 |       | ... |
| D1-0 |       | D1-1 |       | D1-2 |       | D1-3 |       | ... |
| ...  |       |      |       |      |       |      |       |     |

FIG. 8

METHOD FOR CODING SPACE INFORMATION IN CONTINUOUS DYNAMIC IMAGES

CROSS-REFERENCE TO RELATED APPLICATIONS

This application claims priority to PCT Application No. PCT/CN2021/079946, having a filing date of Mar. 10, 2021, which claims priority to CN Application No. 202110242817.X, having a filing date of Mar. 5, 2021, the entire contents of both of which are hereby incorporated by reference.

FIELD OF TECHNOLOGY

The following refers to the field of video effect virtual enhancement synthesis technology, and specifically to a method for coding space information in continuous dynamic images. By this method, it is possible to record and store in real time a plurality of camera physical parameters in continuous dynamic images, such as lens, position and orientation, and space depth information, so that these coded and stored camera parameters, space depth information, can be applied in virtual simulation and graphic visual enhancement scenes.

BACKGROUND

With the continuous progress of graphic image and virtual reality technology and the application of many camera devices, including mobile terminals, it is possible to take video shots and record the surrounding things at any time. With this, it becomes essential to add three-dimensional graphics, images, special effects, text, and other AR virtual graphics images to the existing shooting screen, and to increase the relevant subsidiary information.

In response to this demand, currently, while shooting the image, through high-precision radar, microwave and other equipment to simultaneously scan and capture the depth data of the object in the corresponding camera image, these depth information and the shooting image can be carried out point by point and pixel by pixel correspondence up, each depth point value and the color value of each pixel correspondence. In post-processing, these depth values are used as thresholds to control the automatic interpolation and superposition of each camera frame and the three-dimensional engine graphics for fast synthesis, achieving a good integration of the real shooting images and the virtual graphics generated by the computer three-dimensional engine. And, using the space information of these videos, the physical parameters of the camera, the depth point value of the frame and the color value of the frame correspond, so that according to these data, three-dimensional graphics, images, special effects, text and AR virtual graphics images and other related subsidiary information can be added to the captured frame.

However, the current processing technology generally adds the above-mentioned subsidiary information to each frame manually by post, and then adjusts and renders each frame for overlay, and does not store the space information data of the video in real time by coding, and thus cannot achieve real-time overlay rendering. If according to the continuous and interrelated frames, according to which the image content feature points and perspective relations, get stored camera position X\Y\Z, rotation angle PAN\TILT\ROLL, lens ZOOM and other related information, and then according to this information, after three-dimensional real-time rendering, on the video screen superimposed rendering generated graphic images, because of the same perspective relations, these computer generated graphic images, can be good background video to form a complete and unified effect.

SUMMARY

An aspect relates to a method for coding space information in continuous motion images, which aims to solve the problem of recording and storing space information data such as lens, position, and orientation of camera physical parameters in a plurality of continuous motion images in real time by users during video shooting.

A method of coding space information in a continuous dynamic image of embodiments of the present invention includes the following steps:
  parsing and extracting space information data, parsing and separating out the space information data of each frame in the video separately while the video is being shot, forming independent space information data;
  constructing a space information data packet, constructing a space information data package for storing the space information data according to the categories of the space information;
  coding the space information data packet, utilizing audio tracks or image data for each frame in the video, coding the constructed space information data packet and encapsulating with the audio tracks or the image data to complete the coding of the space information data packet.

Optionally, the space information includes camera physical data and image depth information, the step of constructing a space information data packet includes a sub-process of constructing a camera physical parameter data packet and a sub-process of constructing an image depth data packet.

Wherein the steps of the sub-process of constructing a camera physical parameter data packet includes:
  extracting parameters information on X, Y, Z, PAN, TILT, ROLL, ZOOM of the relevant cameras and lenses in each frame;
  constructing a camera physical parameter data packet and filling the extracted parameter information of the camera and lens into the corresponding fields of the camera physical parameter data packet, respectively;
  establishing start and end identifiers of the camera physical parameter data packet, adding a packet header field and a packet tail field to the head and tail of the camera physical parameter packet, respectively, as start and end identifiers of the camera physical parameter data packet;
  adding a redundant data packet, adding one or more redundant data packets after the camera physical parameter data packet to form a camera physical parameter data packet with the camera physical parameter data packet, wherein the structure and field content of the redundant data packet is consistent with the camera physical parameter data packet.

Optionally, the sub-process of constructing camera physical parameter data packets further comprises the step of constituting a camera data sequence, specifically:
  constituting a camera data unit with a plurality of the camera physical parameter data packets and the redundant data packets, and then constituting a camera data sequence from a plurality of the camera data units, similar to the camera physical parameter data packets, the camera data sequence can also be encapsulated with the audio track or the image data.

In addition, the steps of the process of constructing the image depth data packet includes:

constructing a color channel for storing pixel color data of the video frames and a depth channel for storing depth data of the video frames;

extracting data and converting format, extracting the depth data of each frame in the shooting process, converting data format, normalizing the depth data, to convert it from floating point to 16Bit;

establishing and storing correspondence, establishing a one-to-one correspondence between each the depth data and each pixel color data stored in the color channel, and storing the pixel color data in the color channel, and store the depth data in the depth channel at the same time.

Optionally, the depth data is stored in a pointwise storage, the pointwise storage stores the depth data immediately after the color data for each pixel, to be able to find and process of the color data and depth data of each pixel.

Optionally, the depth data is stored in a row storage, the row storage stores the color data and the depth data alternately at actual row width intervals, to be able to find and process of the color data and the depth data of an entire row of pixels.

Optionally, the depth data is stored in a block storage, the block storage stores all the color data firstly and stores the depth data subsequently, to be able to separately and independently find and process the color data and the depth data of the pixels.

In the actual shooting process, rendering display each frame as a background, the coded packets generated by the coding method of embodiments of the present invention are parsed, and according to the corresponding camera-related parameters information, perspective projection rendering is performed, and three-dimensional graphics, images, special effects, text and other elements are added to the virtual space, while the depth information of the parsed graphics is packaged to form a consistent perspective relationship with the image, the visual effect of MR interpolation and mixing, after Alpha channel, depth channel synthesis, and then improve and enhance the effect of the image when shooting.

Decoding to obtain the depth channel corresponding to each frame of video screen, according to the data arrangement identification, to obtain the depth data, these data and video screen pixels one-to-one correspondence, each frame of depth data are stored independently. Based on the layered rendering synthesis method, virtual three-dimensional graphics, text and video are placed in three-dimensional space by using camera parameters, rendered by perspective projection, and image data with channels are obtained to form a foreground layer, and then the Alpha channel and depth channel in the foreground layer are overlaid with the corresponding background video screen and depth channel to complete the virtual three-dimensional graphics in the foreground and the background video screen with uniform perspective and the foreground virtual three-dimensional graphics and the background video screen have a unified perspective, and the MR screen has the effect of interpolation of the front and back depth.

In film and television shooting, advertising producing, personal video VLOG and many other scenes, the pre-shot image may be relatively simple, can go through such camera parameters, depth information storage, use and post-synthesis, and can implant a rich, one graphic enhancement effect, improving the final image of the art and content expression.

With the method of coding of embodiments of the present invention, it is possible to code and store the physical parameters of the video, such as the physical parameters of the camera, the depth point values of the screen and the color values of the screen, in order to facilitate data archiving, preserving and utilizing of such data for later obtaining the camera parameters at the time of filming in real time to meet the needs of the video screen for virtual graphic rendering and image effect superimposed enhancement. In addition, in the three-dimensional real-time rendering of images, the rendered images are superimposed on the video screen, and because they have the same perspective relationship, these computer-generated images can well form a complete and unified effect of the background video.

BRIEF DESCRIPTION

Some of the embodiments will be described in detail, with references to the following Figures, wherein like designations denote like members, wherein:

FIG. 7 shows a schematic diagram of a storage structure for storing depth data in a point manner according to an embodiment of the present; and FIG. 8 shows a schematic diagram of a storage structure for storing depth data in a point manner according to an embodiment of the present invention.

DETAILED DESCRIPTION

Figure 1:
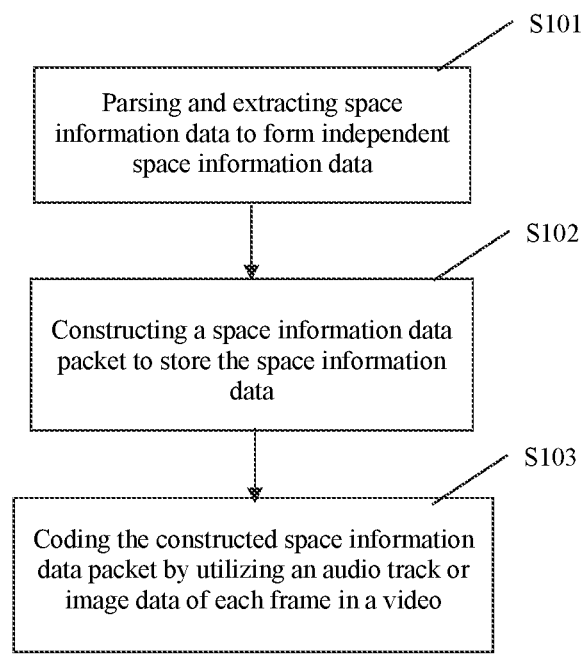
FIG. 1 shows a schematic diagram of a processing flow of a method for coding space information in a continuous dynamic image according to embodiments of the present invention.

FIG. 1 shows a schematic diagram of a processing flow of a method for coding space information in continuous dynamic images according to embodiments of the present invention, comprising the following steps:

S101, parsing and extracting space information data, parsing and separating out the space information data of each frame in the video separately while the video is being shot, forming independent space information data;

S102, constructing a space information data packet, constructing a space information data package for storing the space information data according to the categories of the space information;

S103, coding the space information data packet, utilizing audio tracks or image data for each frame in the video, coding the constructed space information data packet and encapsulating with the audio tracks or the image data to complete the coding of the space information data packet.

Specifically, the space information of embodiments of the present invention includes camera physical data and image depth information, the step of constructing a space information data packet includes a sub-process of constructing a camera physical parameter data packet and a sub-process of constructing an image depth data packet.

Wherein the camera physical parameters mentioned above include: position X\Y\Z, rotation angle PAN\TILT\ROLL and lens ZOOM parameters, as subsidiary information, each frame has a set of camera parameters corresponding to it. Camera position X, is the horizontal right coordinate position, its unit is mm; camera position Y, is the vertical up coordinate position, its unit is mm; camera position Z, is the horizontal outward coordinate position, its unit is mm; camera rotation angle PAN, is the camera around the axis Y rotation angle, its unit is degrees, 0 degrees is the coordinate plane of YZ, range −180.0 degrees~+180.0 degrees, the right hand counterclockwise for positive values; camera rotation angle TILT, is the camera rotation angle around the axis X, its unit is degrees, 0 degrees XZ of the coordinate plane, the range of −90.0 degrees~+90.0 degrees, the right hand counterclockwise for positive values; camera rotation angle ROLL, is the camera rotation angle around the axis Z, its unit is degrees, 0 degrees YZ of the coordinate plane, the range of −180.0 degrees~+180.0 degrees right hand counterclockwise for positive values; camera ZOOM parameters, is the camera vertical viewport tension angle, its unit is degrees, range 0.0 degrees~+180.0 degrees. The above is the video screen, can contain the physical attributes of the camera or lens parameters.

Figure 2:
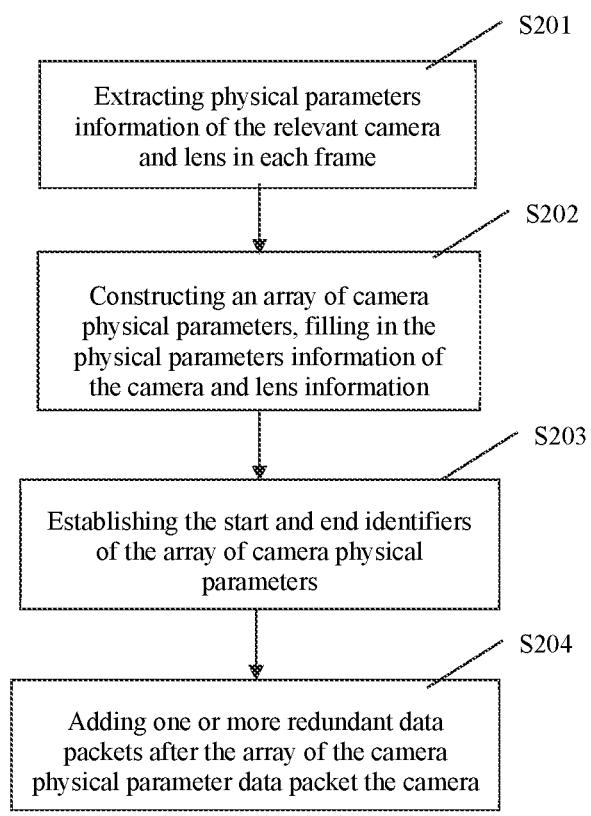
FIG. 2 shows a schematic diagram of a process of constructing a sub-process of the physical parameter data packet of the camera according to an embodiment of the present invention.

FIG. 2 shows a schematic diagram of a process flow for constructing a sub-process of a physical parameter data packet of a camera according to an embodiment of the present invention, includes the following steps:

S201, extracting parameters information on X, Y, Z, PAN, TILT, ROLL, ZOOM of the relevant cameras and lenses in each frame;

S202, constructing a camera physical parameter data packet and filling the extracted parameter information of the camera and lens into the corresponding fields of the camera physical parameter data packet, respectively;

S203, establishing start and end identifiers of the camera physical parameter data packet, adding a packet header field and a packet tail field to the head and tail of the camera physical parameter packet, respectively, as start and end identifiers of the camera physical parameter data packet;

S204, adding a redundant data packet, adding one or more redundant data packets after the camera physical parameter data packet to form a camera physical parameter data packet with the camera physical parameter data packet, wherein the structure and field content of the redundant data packet is consistent with the camera physical parameter data packet.

Figures 3, 4:
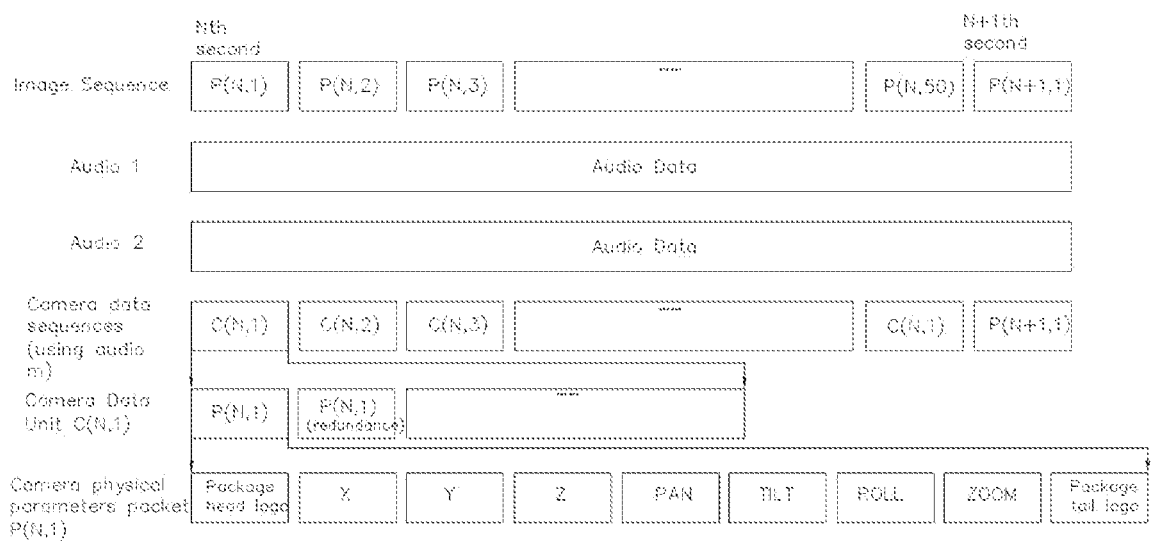
FIG. 3 shows a schematic diagram of a structure of the physical parameter data packet of the camera according to an embodiment of the present invention.
FIG. 4 shows a schematic diagram of a structure of each video frame containing a packet of physical parameters of the camera according to an embodiment of the present invention.

The structure of the generated camera physical parameter packet through the above steps is shown in FIG. 3.

Further, optionally, the sub-process of constructing camera physical parameter data packets further comprises the step of constituting a camera data sequence, specifically:

constituting a camera data unit with a plurality of the camera physical parameter data packets and the redundant data packets, and then constituting a camera data sequence from a plurality of the camera data units, similar to the camera physical parameter data packets, the camera data sequence can also be encapsulated with the audio track or the image data.

FIG. 4 shows a schematic diagram of the structure of each video frame containing a packet of camera physical parameters data according to an embodiment of the present invention, wherein audio sampling points per second contain a continuous packet of camera data corresponding to the number of standard frames. Here 50 frames per second as an example: the processing of audio data is best without compression, the compression ratio will lead to slight distortion of the data; through a decoder can be decoded, analyzed to obtain the corresponding camera physical parameters; video and audio data and camera physical parameters can be unified package as a file.

In the schematic diagram of the structure of each video frame shown in FIG. 4, each video frame with the audio channel of the camera information data, according to the beginning and end of the camera physical parameters packet identification, analysis to obtain the camera parameters, these parameters and each frame of the video frame independently corresponding to each frame of the camera parameters are stored independently. Wherein, the camera data sequence comprises one or more camera data units; the camera data units comprise one or more camera physical parameter data packets.

Figures 5, 6:
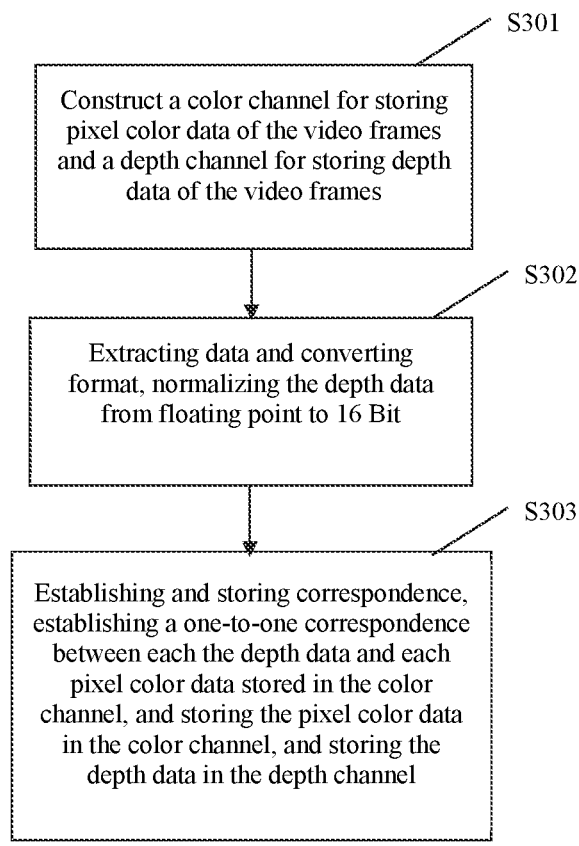
FIG. 5 shows a schematic diagram of a process of constructing a sub-process of an image depth data packet according to an embodiment of the present invention.
FIG. 6 shows a schematic diagram of a storage structure for storing depth data in a point manner according to an embodiment of the present.

FIG. 5 shows a schematic diagram of the process flow of constructing an image depth data packet sub-process according to an embodiment of the present invention, includes the following steps:

S301, constructing a color channel for storing pixel color data of the video frames and a depth channel for storing depth data of the video frames;

S302, extracting data and converting format, extracting the depth data of each frame in the shooting process, converting data format, normalizing the depth data, to convert it from floating point to 16Bit;

S303, establishing and storing correspondence, establishing a one-to-one correspondence between each the depth data and each pixel color data stored in the color channel, and storing the pixel color data in the color channel, and store the depth data in the depth channel at the same time.

Embodiments of the present invention store the depth data together with the color data of the image through the constructed color channel and depth channel, forming an independent storage method of color channel and depth channel, and finally generating a playable image sequence. For the depth data, to guarantee the depth data accuracy, the depth data of each pixel is 16 Bit. Using the additional channel of the video screen to store the depth information, the depth information of floating point type is normalized and transformed into 16 Bit data storage.

Referring to FIG. 6-FIG. 8, the following is an example of three storage methods for storing the depth data: point method storage, line method storage, and block method storage, using the video data YUYV422 and 8Bite word length in the video screen as storage methods and the depth data taking 16Bit storage method.

Point Method Storage

Referring to FIG. 6, a schematic diagram of a storage structure for storing depth data in a point manner according to an embodiment of the present invention is shown in FIG. 6. The pointwise storage stores the depth data immediately after the color data for each pixel, to be able to find and process of the color data and depth data of each pixel.

Row Mode Storage

Referring to FIG. 7, a schematic diagram of a storage structure for storing depth data in a row manner according to an embodiment of the present invention is shown in FIG. 7. The row storage stores the color data and the depth data alternately at actual row width intervals, to be able to find and process of the color data and the depth data of an entire row of pixels.

Block Mode Storage

FIG. 8 shows a schematic diagram of a storage structure for storing depth data in a row wise manner according to an embodiment of the present invention. The block storage stores all the color data firstly and stores the depth data subsequently, to be able to separately and independently find and process the color data and the depth data of the pixels.

In the actual shooting process, rendering and displaying each frame as a background, the coded packets which are generated by the coding method of embodiments of the present invention are parsed, and according to the parsed information of the corresponding camera-related parameters, perspective projection rendering is performed, and three-dimensional graphics, images, special effects, text and other elements are added to the virtual space, while the depth information of the parsed graphics is packaged to form a consistent perspective relationship with the screen In addition, the visual effect of MR interpolation and mixing, after Alpha channel, depth channel synthesis, and then improve and enhance the effect of the image when shooting.

Decoding to obtain the depth channel corresponding to each frame of video frame, according to the data arrangement identification, to obtain depth data, these instructions data and video frame pixels one-to-one correspondence, each frame of depth data are stored independently. Based on the layered rendering synthesis method, virtual three-dimensional graphics, text and video are placed in three-dimensional space by using camera parameters, rendered by perspective projection, image data with channels are obtained to form a foreground layer, and then the Alpha channel and depth channel in the foreground layer are used to overlay with the corresponding background video screen and depth channel to complete the foreground virtual three-dimensional graphics and background video screen with uniform perspective and the foreground virtual three-dimensional graphics and the background video screen have a unified perspective, and the MR screen has the effect of interpolation of the front and back depth.

In film and television shooting, advertising producing, personal video VLOG and many other scenes, the pre-shot image may be relatively simple, can go through such camera parameters, depth information storage, use and post-synthesis, and you can implant a rich, one graphic enhancement effect, improving the final image of the art and content expression.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for coding space information in continuous dynamic images, wherein the method comprises:
    parsing and extracting space information data, parsing and separating out the space information data of each frame in a video separately while the video being shot, forming independent space information data;
    constructing a space information data packet, the constructing the space information data packet for storing the space information data according to categories of the space information;
    coding the space information data packet, using audio tracks or image data for the each frame in the video, coding the constructed space information data packet and encapsulating with the audio tracks or the image data to complete the coding of the space information data packet; the space information includes camera physical data and an image depth packet, the constructing the space information data packet includes a sub-process of constructing a camera physical parameter data packet and a sub-process of constructing an image depth data packet; the sub-process of constructing the camera physical parameter data packet includes:
    extracting parameters information on camera positions X, Y, Z, rotation angles PAN, TILT, ROLL, ZOOM of relevant cameras and lenses in the each frame;
    constructing the camera physical para meter data packet and filling the extracted parameter information of the camera and lens into corresponding fields of the camera physical parameter data packet;
    establishing start and end identifiers of the camera physical parameter data packet, adding a packet header field and a packet tail field to the head and tail of the camera physical para meter data packet as the start and end identifiers of the camera physical parameter data packet; and
    adding a redundant data packet, adding one or more redundant data packets after the camera physical parameter data packet to form a different camera physical parameter data packet with the camera physical parameter data packet, wherein the structure and field content of the redundant data packet is consistent with the camera physical parameter data packet.

2. The method according to claim 1, wherein the sub-process of the constructing the camera physical parameter data packet further comprises constituting a camera data sequence, specifically:
    constituting a camera data unit with a plurality of camera physical parameter data packets and the redundant data packet, and then constituting the camera data sequence from a plurality of camera data units, similar to the plurality of camera physical parameter data packets, the camera data sequence can also be encapsulated with the audio track or the image data.

3. The method according to claim 1, wherein the sub-process of constructing the image depth data packet includes:
    constructing a color channel for storing pixel color data of video frames and a depth channel for storing depth data of the video frames;
    extracting data and converting format, extracting the depth data of the each frame in the shooting process, converting data format, normalizing the depth data, to convert the depth data from floating point to 16Bit;
    establishing and storing correspondence, establishing a one-to-one correspondence between each the depth data and each pixel color data stored in the color channel, and storing the pixel color data in the color channel, and storing the depth data in the depth channel at a same time.

4. The method according to claim 3, wherein the depth data is stored in a pointwise storage, the pointwise storage stores the depth data immediately after the pixel color data for each pixel, to be able to find and process the pixel color data and depth data of each pixel.

5. The method according to claim 3, wherein the depth data is stored in a row storage, the row storage stores the pixel color data and the depth data alternately at actual row width intervals, to be able to find and process the pixel color data and the depth data of an entire row of pixels.

6. The method according to claim 3, wherein the depth data is stored in a block storage, the block storage stores all the pixel color data firstly and stores the depth data subsequently, to be able to separately and independently find and process the pixel color data and the depth data of the pixels.

7. The method according to claim 1, wherein the method is used in a process of shooting multiple scenes for film and television shooting, advertising producing, and personal video blog (VLOG) with camera equipment;
wherein the camera equipment includes a video camera, a camera, and a cell phone.

* * * * *